(12) United States Patent
LaRose, Jr. et al.

(10) Patent No.: US 8,443,591 B2
(45) Date of Patent: May 21, 2013

(54) EXHAUST GAS OXYGEN CONCENTRATION CONTROL SYSTEM AND METHOD

(75) Inventors: Thomas LaRose, Jr., Redford, MI (US); Jason Daniel Mullins, Brighton, MI (US); Eric R. Snyder, Waterloo, IA (US); Matthew King, Waterford, MI (US); Paul Jasinkiewicz, Northville, MI (US); Nicasio Gomez, III, Howell, MI (US)

(73) Assignee: GM Global Technology Operations LLC

( * ) Notice: Subject to any disclaimer, the term of this patent is extended or adjusted under 35 U.S.C. 154(b) by 721 days.

(21) Appl. No.: 12/615,363

(22) Filed: Nov. 10, 2009

(65) Prior Publication Data

US 2011/0107741 A1 May 12, 2011

(51) Int. Cl.
*F01N 3/00* (2006.01)
*F01N 3/02* (2006.01)

(52) U.S. Cl.
USPC .................. 60/295; 60/276; 60/285; 60/311

(58) Field of Classification Search
USPC ................. 60/274, 276, 278, 285, 290, 295, 60/297, 311
See application file for complete search history.

(56) References Cited

U.S. PATENT DOCUMENTS

| | | | |
|---|---|---|---|
| 2004/0194450 A1* | 10/2004 | Tanaka et al. | 60/285 |
| 2005/0086933 A1* | 4/2005 | Nieuwstadt et al. | 60/297 |
| 2006/0096280 A1* | 5/2006 | Zhan et al. | 60/297 |
| 2007/0130923 A1* | 6/2007 | Dye et al. | 60/295 |
| 2008/0173010 A1* | 7/2008 | Suresh et al. | 60/287 |
| 2010/0275582 A1* | 11/2010 | Wada et al. | 60/276 |

FOREIGN PATENT DOCUMENTS

| | | | |
|---|---|---|---|
| CN | 1461379(A) | | 12/2003 |
| JP | 61079814 A | * | 4/1986 |
| JP | 2001254616 A | * | 9/2001 |

OTHER PUBLICATIONS

Kenichiro Takama, English Translation of JP 61-079814 A, Apr. 23, 1986, Translation Provided by FLS, Inc.*

* cited by examiner

*Primary Examiner* — Kenneth Bomberg
*Assistant Examiner* — Audrey K Bradley

(57) ABSTRACT

An engine control system comprises an oxygen comparison module and a regeneration control module. The oxygen comparison module compares an oxygen concentration of an exhaust gas of an engine to an oxygen threshold. A regeneration control module initiates regeneration of a particulate filter and controls regeneration based on the oxygen comparison and at least one of a particulate filter load, a particulate filter temperature, and a speed of the engine.

24 Claims, 3 Drawing Sheets

EXHAUST GAS OXYGEN CONCENTRATION CONTROL SYSTEM AND METHOD

FIELD

The present disclosure relates to vehicle exhaust systems, and more particularly to a system and method for controlling exhaust gas oxygen concentration during regeneration of a particulate matter filter.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

During combustion, an air/fuel mixture is delivered to cylinders of an engine and is ignited. The combustion forces pistons in the cylinders to turn a crankshaft and produce drive torque. After combustion, the pistons force exhaust gas in the cylinders into an exhaust system. Engines such as diesel engines and compression ignition engines may produce particulate matter (PM) that is filtered from the exhaust gas and collected by a PM filter of the exhaust system.

Over time, the amount of PM in the PM filter may increase. When the amount of PM is greater than a predetermined amount, the PM may be burned during a process called regeneration. Regeneration may include heating the PM filter to a PM combustion temperature to ignite the PM. For example only, an engine control module may adjust engine operating parameters such as fuel or air to increase the exhaust gas temperature, which heats the PM filter.

SUMMARY

An engine control system comprises an oxygen comparison module and a regeneration control module. The oxygen comparison module compares an oxygen concentration of an exhaust gas of an engine to an oxygen threshold. A regeneration control module initiates regeneration of a particulate filter and controls regeneration based on the oxygen comparison and at least one of a particulate filter load, a particulate filter temperature, and a speed of the engine.

In other features, the regeneration control module controls an airflow of the engine to adjust the oxygen concentration during regeneration. The regeneration control module controls regeneration by decreasing the oxygen concentration when the oxygen concentration is greater than the oxygen threshold and the particulate filter load is greater than a filter load threshold. The regeneration control module controls regeneration by decreasing the oxygen concentration when the oxygen concentration is greater than the oxygen threshold and the particulate filter temperature increases by a predetermined amount within a predetermined time of initiation of regeneration. The regeneration control module controls regeneration by decreasing the oxygen concentration when the oxygen concentration is greater than the oxygen threshold and the speed of the engine is less than or equal to a speed threshold. The regeneration control module controls regeneration by increasing the oxygen concentration when the oxygen concentration is less than the oxygen threshold.

In still other features, the regeneration control module controls an amount of exhaust gas recirculation of the engine during regeneration to adjust the oxygen concentration. The regeneration control module controls a manifold pressure of the engine during regeneration to adjust the oxygen concentration. The regeneration control module controls regeneration by adjusting at least one of a throttle valve, an exhaust gas recirculation valve, and a turbocharger. The oxygen comparison module measures the oxygen concentration based on a signal from a gas sensor selected from a group of gas sensors including an oxygen sensor, a NOx sensor, and a lambda sensor.

A method comprises comparing an oxygen concentration of an exhaust gas of an engine to an oxygen threshold; initiating regeneration of a particulate filter; and controlling regeneration of the particulate filter based on the oxygen comparison and at least one of a particulate filter load, a particulate filter temperature, and a speed of the engine.

In other features, the method further comprises controlling an airflow of the engine to adjust the oxygen concentration during regeneration. In still other features, the method further comprises decreasing the oxygen concentration when the oxygen concentration is greater than the oxygen threshold and the particulate filter load is greater than a filter load threshold. In still other features, the method further comprises decreasing the oxygen concentration when the oxygen concentration is greater than the oxygen threshold and the particulate filter temperature increases by a predetermined amount within a predetermined time of initiation of regeneration.

In still other features, the method further comprises decreasing the oxygen concentration when the oxygen concentration is greater than the oxygen threshold and the speed of the engine is less than or equal to a speed threshold. In still other features, the method further comprises increasing the oxygen concentration when the oxygen concentration is less than the oxygen threshold.

In still other features, the method further comprises controlling an amount of exhaust gas recirculation of the engine during regeneration to adjust the oxygen concentration. In still other features, the method further comprises controlling a manifold pressure of the engine during regeneration to adjust the oxygen concentration. In still other features, the method further comprises controlling regeneration by adjusting at least one of a throttle valve, an exhaust gas recirculation valve, and a turbocharger.

In still other features, the method further comprises measuring the oxygen concentration based on a signal from a gas sensor selected from a group of gas sensors including an oxygen sensor, a NOx sensor, and a lambda sensor.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
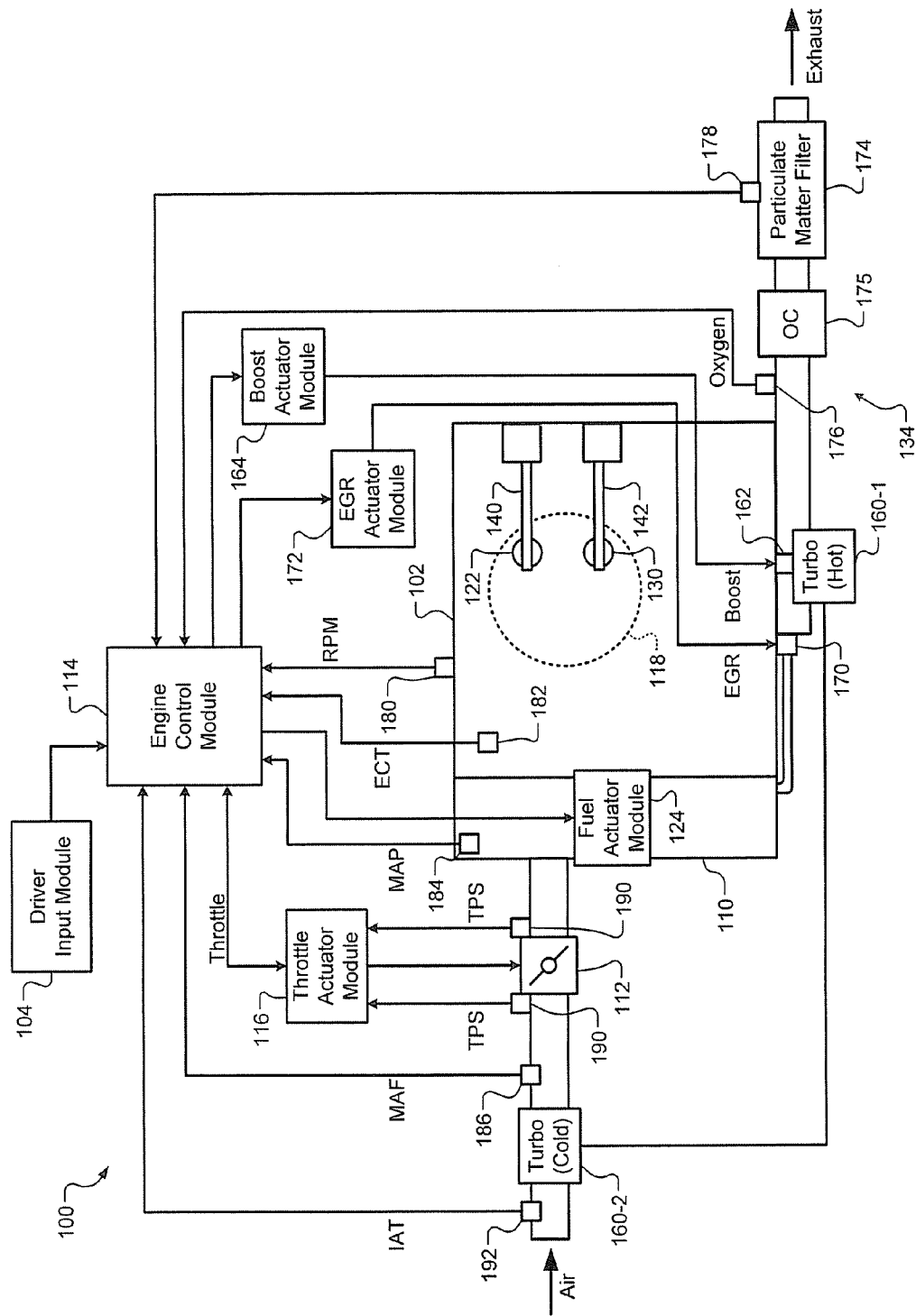
FIG. 1 is a functional block diagram of an engine system according to the principles of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

During regeneration, PM combusts with oxygen present in the exhaust gas and generates heat. Completion of regeneration may depend on an efficiency of the PM combustion. The efficiency may depend on an oxygen concentration of the exhaust gas. In addition, the PM filter is susceptible to thermal damage due to the heat generated by PM combustion. The heat generated by PM combustion may also depend on the oxygen concentration of the exhaust gas.

The PM may not combust or may combust inefficiently when the oxygen concentration is less than a first oxygen concentration threshold. Inefficient PM combustion may delay completion of regeneration or may cause incomplete regeneration of the PM filter. Less heat may be generated by inefficient PM combustion than by efficient PM combustion. When the oxygen concentration is greater than or equal to the first oxygen threshold, PM may combust efficiently. More heat is generated by efficient PM combustion than by inefficient PM combustion. As a vehicle is driven and regeneration begins, a portion of the heat from PM combustion may be absorbed by exhaust gas flowing through the PM filter. The PM filter temperature may stabilize to a regeneration temperature.

When the vehicle transitions to idle conditions within a period after regeneration of a fully loaded PM filter begins, the PM filter temperature may not stabilize. Fueling to the engine may be reduced to decrease engine speed to an idle speed. The reduced fueling may cause the oxygen concentration of the exhaust gas to increase. The increased oxygen concentration may increase the PM combustion efficiency and generate more heat. In addition, less exhaust gas flows through the PM filter due to the decreased engine speed, and thus, less heat may be absorbed by the exhaust gas. When the oxygen concentration is greater than a second oxygen concentration threshold during the transition to idle conditions, the PM filter temperature may increase and cause thermal damage to the PM filter.

The present oxygen concentration control system and method controls regeneration by adjusting an airflow of the engine to adjust the oxygen concentration of the exhaust gas during regeneration. The control system and method controls regeneration of the PM filter based the oxygen concentration and at least one of, engine speed, the particulate filter load, the particulate filter temperature, and the period after regeneration begins. The control system and method adjusts the airflow during regeneration to promote efficient PM combustion while protecting the PM filter from thermal damage due to transitions to idle conditions.

Controlling the airflow may include controlling the amount of air entering the cylinders. Controlling the airflow may include controlling an amount of exhaust mixed with the air before the air enters the cylinders. The airflow may be controlled by controlling an intake throttle valve, a turbocharger, and/or an exhaust gas recirculation valve. By controlling the air entering the cylinders, the oxygen concentration of the exhaust may be adjusted.

Referring now to FIG. 1, a functional block diagram of an exemplary engine system 100 is presented. The engine system 100 includes an engine 102 that combusts an air/fuel mixture to produce drive torque for a vehicle based on a driver input module 104. Air is drawn into an intake manifold 110 through a throttle valve 112. For example only, the throttle valve 112 may include a butterfly valve having a rotatable blade. An engine control module (ECM) 114 controls a throttle actuator module 116, which regulates opening of the throttle valve 112 to control the amount of air drawn into the intake manifold 110.

Air from the intake manifold 110 is drawn into cylinders of the engine 102. While the engine 102 may include multiple cylinders, for illustration purposes a single representative cylinder 118 is shown. For example only, the engine 102 may include 2, 3, 4, 5, 6, 8, 10, and/or 12 cylinders. Air from the intake manifold 110 is drawn into the cylinder 118 through an intake valve 122. The ECM 114 controls a fuel actuator module 124, which regulates fueling to achieve a desired engine torque.

A piston (not shown) within the cylinder 118 compresses the air and fuel actuator module 124 injects fuel. The combustion of the air/fuel mixture drives the piston down, thereby driving a rotating crankshaft (not shown). The piston then begins moving up again and expels the byproducts of combustion through an exhaust valve 130. The byproducts of combustion are exhausted from the vehicle via an exhaust system 134.

An intake camshaft 140 may control the intake valve 122, while an exhaust camshaft 142 may control the exhaust valve 130. In various implementations, multiple intake camshafts may control multiple intake valves per cylinder and/or may control the intake valves of multiple banks of cylinders. Similarly, multiple exhaust camshafts may control multiple exhaust valves per cylinder and/or may control exhaust valves for multiple banks of cylinders.

The engine system 100 may include a boost device that provides pressurized air to the intake manifold 110. For example, FIG. 1 shows a turbocharger 160 that includes a hot turbine 160-1 that is powered by hot exhaust flowing through the exhaust system 134. The turbocharger 160 also includes a cold air compressor 160-2, driven by the turbine 160-1, that compresses air leading into the throttle valve 112. In various implementations, a supercharger, driven by the crankshaft, may compress air from the throttle valve 112 and deliver the compressed air to the intake manifold 110.

A wastegate 162 may allow exhaust to bypass the turbocharger 160, thereby reducing the boost (the amount of intake air compression) of the turbocharger 160. The turbocharger 160 may include variable vane geometry in the turbine 160-1 to similarly adjust the boost. The ECM 114 controls the turbocharger 160 via a boost actuator module 164. The boost actuator module 164 may modulate the boost of the turbocharger 160 by controlling the position of the wastegate 162 and/or the variable vane geometry. In various implementations, the boost actuator module 164 may control multiple turbochargers.

An intercooler (not shown) may dissipate some of the heat generated by compression of the air charge. The compressed air charge may also have absorbed heat because of the proximity of the air to the exhaust system 134. Although shown separated for purposes of illustration, the turbine 160-1 and the compressor 160-2 are often attached to each other, placing intake air in close proximity to hot exhaust.

The engine system 100 may include an exhaust gas recirculation (EGR) valve 170, which selectively redirects exhaust back to the intake manifold 110. The EGR valve 170 may be located upstream of the turbocharger 160. An EGR actuator module 172 may control the EGR valve 170. Exhaust may be used to displace air in the cylinders. Exhaust may not combust with fuel and may contain less oxygen than air. The exhaust may be cooled or uncooled exhaust.

The exhaust system 134 may include an exhaust aftertreatment system such as urea injection and/or a catalytic converter (not shown). The exhaust system 134 may include a particulate matter (PM) filter 174 that removes particulate matter (PM) from the exhaust. The PM filter 174 may be selectively regenerated to oxidize the PM. The ECM 114 may initiate regeneration by adjusting an exhaust gas temperature to increase a PM filter temperature. For example only, an oxidation catalyst 175 may be used to increase the exhaust gas temperature before the exhaust enters the PM filter 174. Fuel may combust in the oxidation catalyst 175 to increase the exhaust gas temperature. The increased exhaust gas temperature increases the PM filter temperature.

A gas sensor 176 may measure an oxygen concentration in the exhaust gas. The gas sensor 176 may be a NOx sensor, an oxygen sensor, a lambda sensor, or other sensor which may be used to determine oxygen concentrations. The oxygen concentration in the exhaust corresponds to the air/fuel mixture combusted in the cylinders. A temperature sensor 178 may measure the PM filter temperature. Other temperature sensors (not shown) may measure various exhaust gas temperatures and exhaust system temperatures. The ECM 114 may also generate a temperature model for the various temperatures.

The engine system 100 may measure the speed of the crankshaft in revolutions per minute (RPM) using an RPM sensor 180. An engine coolant temperature (ECT) sensor 182 may measure the temperature of the engine coolant. The ECT sensor 182 may be located within the engine 102 or at other locations where the coolant is circulated, such as a radiator (not shown).

A manifold absolute pressure (MAP) sensor 184 may measure the pressure within the intake manifold 110. In various implementations, the ECM 114 may determine or measure engine vacuum, which is the difference between ambient air pressure and the pressure within the intake manifold 110. A mass airflow (MAF) sensor 186 may measure the mass flow rate of air flowing into the intake manifold 110. In various implementations, the MAF sensor 186 may be located in a housing that also includes the throttle valve 112. The ECM 114 may calculate an engine load based on the MAF signal and/or the MAP signal.

The throttle actuator module 116 may monitor the position of the throttle valve 112 using one or more throttle position sensors (TPS) 190. An intake air temperature (IAT) sensor 192 may measure the ambient temperature of air being drawn into the engine 102. The ECM 114 may use signals from the sensors to make control decisions for the engine system 100.

Each system that varies an engine parameter may be referred to as an actuator that receives an actuator value. For example, the throttle actuator module 116 may be referred to as an actuator and the throttle opening area may be referred to as the actuator value. In the example of FIG. 1, the throttle actuator module 116 achieves the throttle opening area by adjusting the angle of the blade of the throttle valve 112.

Similarly, the fuel actuator module 124 may be referred to as an actuator, while the corresponding actuator value may be the amount of fuel injected into the cylinder 118. Other actuators may include the boost actuator module 164 and the EGR actuator module 172. For these actuators, the actuator values may correspond to boost pressure and an EGR valve opening area, respectively. The ECM 114 may control actuator values in order to generate a desired torque from the engine 102, to regenerate the PM filter 174, and to control the oxygen concentration in the exhaust.

The ECM 114 may regenerate the PM filter 174 based on a PM filter load value. The PM filter load value may be an estimated amount of PM in the PM filter 174. The ECM 114 may estimate the PM filter load value based on the MAF and fueling to the engine 102. The ECM 114 may initiate regeneration when the PM filter load value is greater than a regeneration load. The ECM 114 may also initiate regeneration based on an engine on timer, vehicle distance traveled, or fuel consumption. Regeneration may begin by adjusting the mass airflow and/or fueling to the engine 102 to increase the PM filter temperature to a PM combustion temperature. PM combustion may begin when the PM filter temperature is greater than or equal to the PM combustion temperature and a sufficient oxygen concentration is present in the exhaust gas.

During regeneration, an efficiency of the PM combustion may depend on the oxygen concentration of the exhaust. For example only, PM may continue to combust efficiently while the oxygen concentration is greater than or equal to a first oxygen concentration threshold. PM may not continue to combust or may combust inefficiently while the oxygen concentration is less than the first oxygen concentration threshold. Inefficient PM combustion may delay completion of regeneration or may cause incomplete regeneration of the PM filter 174.

PM combustion also generates additional heat that may further increase the PM filter temperature. While the vehicle is moving and/or the engine 102 is not operating under idle conditions, the exhaust and ambient air surrounding the PM filter 174 may absorb a portion of the heat and stabilize the PM filter temperature during regeneration. Idle conditions may include decreased fueling, decreased exhaust flow, decreased engine speed, and decreased vehicle speed relative to when the vehicle is moving.

The engine 102 may transition to idle conditions during regeneration. The oxygen concentration may increase as fueling to the engine 102 decreases to an idle fueling level. The increased oxygen concentration may increase the efficiency of the PM combustion. As the efficiency increases, the PM filter temperature may increase. The exhaust flow may decrease as engine speed decreases to an idle engine speed. The idle engine speed may be less than a speed threshold. The decreased exhaust flow may absorb less heat from the PM combustion. The PM filter temperature may further increase due to the decreased exhaust flow. In addition, vehicle speed may decrease resulting in decreased heat transfer to ambient air flowing around the PM filter 174.

When the PM filter 174 is fully loaded with PM and the transition to idle conditions occurs, the oxygen concentration may be greater than or equal to a second oxygen concentration threshold. The PM filter temperature may increase by more than a predetermined amount within a period after regeneration begins. The PM filter temperature may continue to increase to a PM filter temperature that causes damage to the PM filter 174.

The ECM 114 may adjust the oxygen concentration to maintain efficient PM combustion and prevent damage to the PM filter 174 during regeneration. The ECM 114 may control the airflow of the engine 102 to adjust the oxygen concentration during regeneration. Controlling the airflow may include controlling the amount of air entering the cylinders 118. Controlling the airflow may include controlling an amount of exhaust mixed with the air before the air enters the cylinders 118. The airflow may be controlled by controlling the intake throttle valve 112, the turbocharger 160, and/or the EGR valve 170. By controlling the air entering the cylinders 118, the oxygen concentration of the exhaust may be adjusted.

Figure 2:
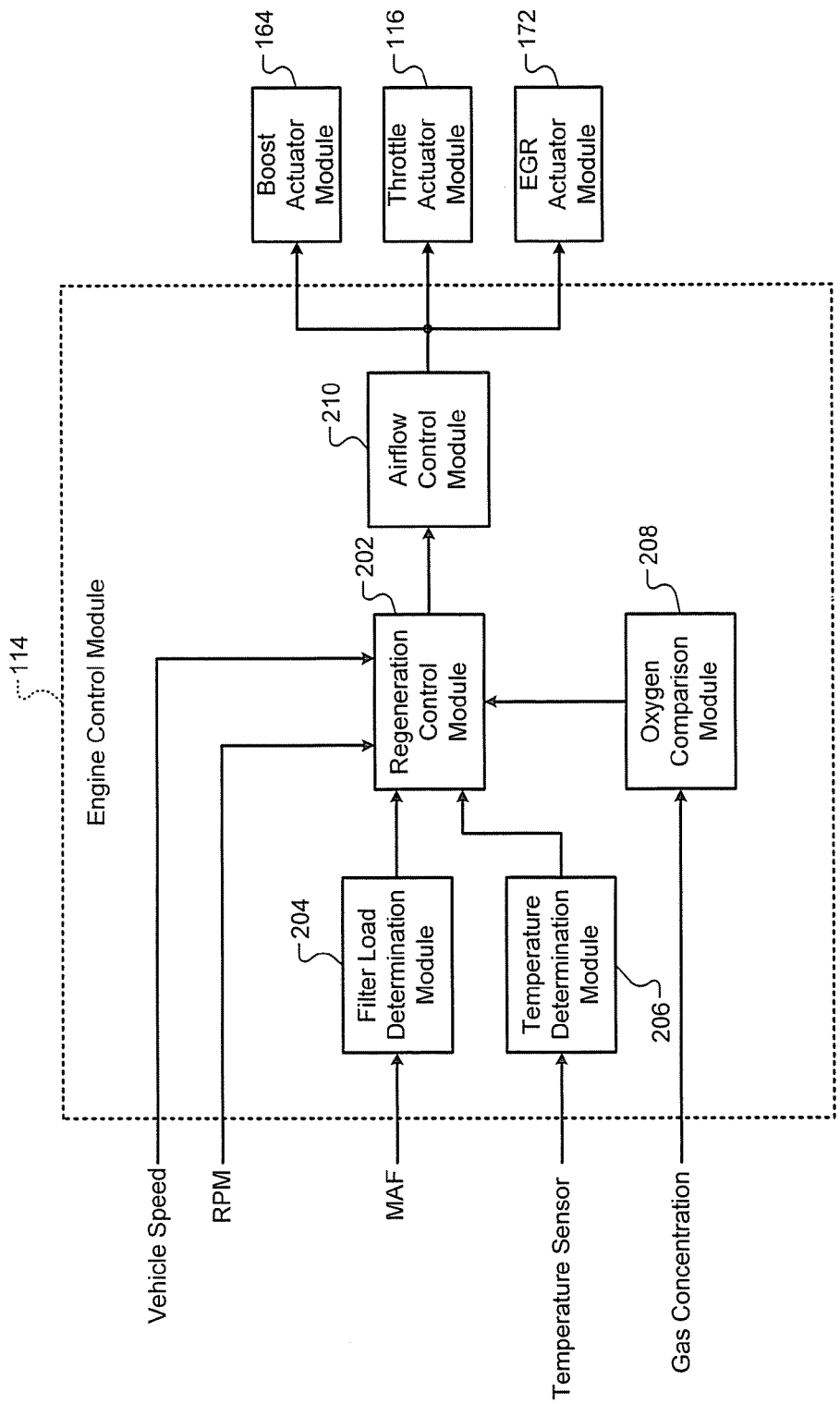
FIG. 2 is a functional block diagram of an exemplary engine control module according to the principles of the present disclosure.

Referring now to FIG. 2, a functional block diagram of an exemplary ECM 114 is presented according the principles of the present disclosure. The ECM 114 may include a regeneration control module 202. The regeneration control module 202 may initiate regeneration of the PM filter 174 based on the PM filter load and the PM filter temperature. A filter load determination module 204 may determine the PM filter load based on the MAF signal and/or other engine conditions. For example only, when the PM filter load is greater than or equal to the regeneration load, the regeneration control module 202 may begin regeneration of the PM filter 174. The regeneration control module 202 may store an initial PM filter temperature in memory when regeneration begins. A temperature determination module 206 may determine the PM filter temperature based on the temperature sensor 178 and/or an exhaust temperature model.

An oxygen comparison module 208 may compare the oxygen concentration of the exhaust gas to an oxygen threshold during regeneration. The oxygen threshold may be one of a plurality of oxygen thresholds. For example only, the oxygen threshold may be one of a first threshold and a second threshold.

During regeneration, the regeneration control module 202 may monitor various engine and vehicle operating conditions in addition to the PM filter load and PM filter temperature. For example only, the regeneration control module 202 may monitor engine speed and vehicle speed to determine whether the vehicle is operating under idle conditions. The regeneration control module 202 may control regeneration of the PM filter 174 based on the oxygen comparison and at least one of engine speed, vehicle speed, the PM filter load, and the filter temperature. The regeneration control module 202 may generate an airflow adjustment signal to control regeneration of the PM filter 174.

An air control module 210 may receive the airflow adjustment signal and control the airflow of the engine 102. For example only, during the first mode, the air control module 212 may control the airflow to increase the oxygen concentration when the oxygen concentration is less than the first threshold during regeneration. The air control module 212 may control the airflow to decrease the oxygen concentration when the oxygen concentration is greater than the second threshold.

Controlling the airflow may include controlling the throttle actuator module 116 to adjust the amount of air entering the cylinders. Controlling the airflow may include controlling the boost actuator module 164 to adjust the amount of boost pressure. Controlling the airflow may include controlling the EGR actuator module 172 to adjust an amount of exhaust gas mixed with the air. By controlling the airflow entering the cylinders 118, the oxygen concentration of the exhaust may be adjusted during regeneration.

Figure 3:
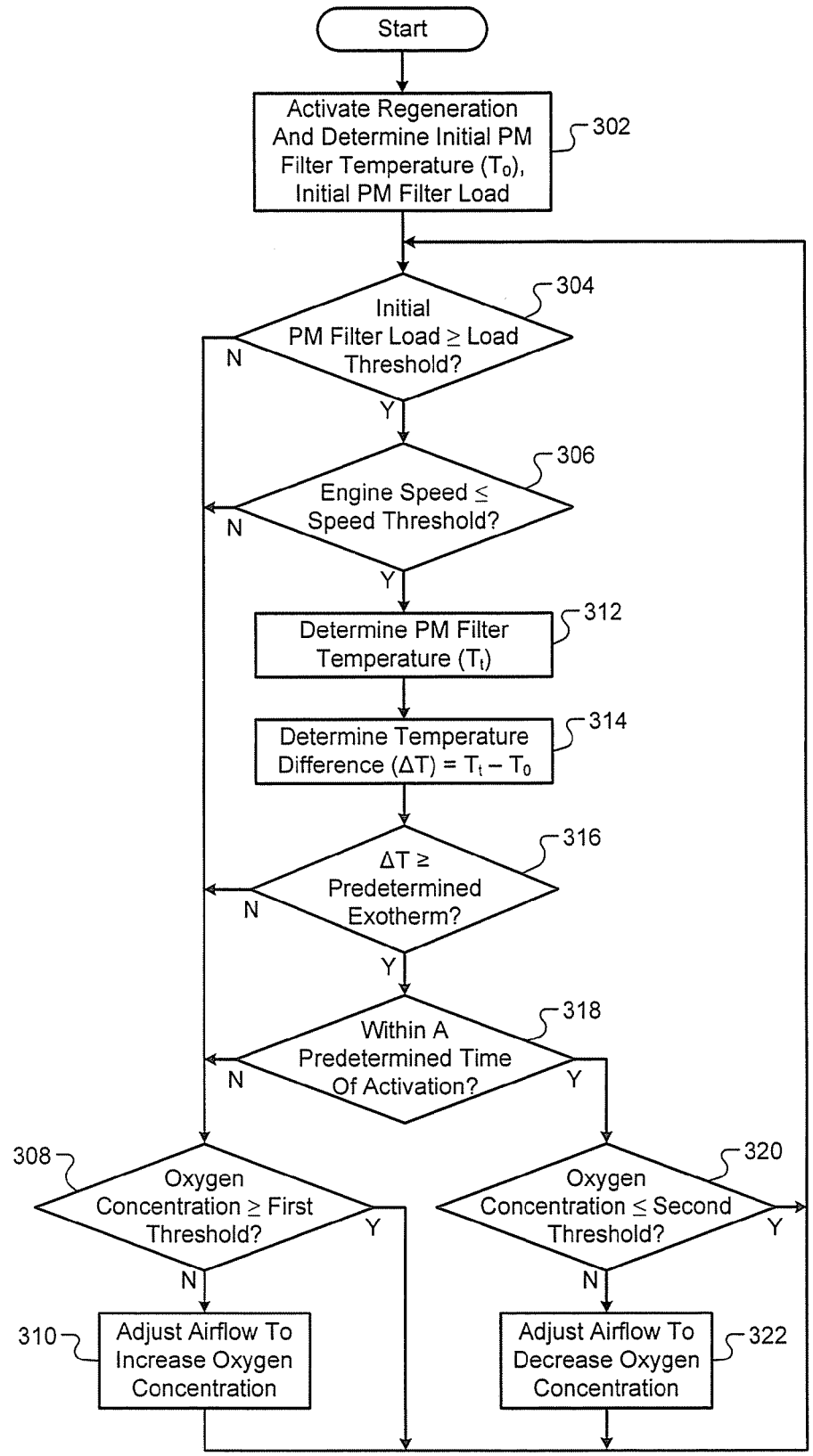
FIG. 3 is a flowchart depicting exemplary steps performed in the engine control module.

Referring now to FIG. 3, a flowchart 300 depicts exemplary steps of an engine control system according to the principles of the present disclosure. In step 302, control activates regeneration and determines an initial PM filter temperature and an initial PM filter load.

In step 304, control determines whether the initial PM filter load is greater than or equal to a load threshold. For example only, the load threshold may correspond to a full PM filter 174. When the PM filter load is greater than or equal to the load threshold, control continues to step 306, otherwise control proceeds to step 308. In step 308, control compares the oxygen concentration to the first threshold. When the oxygen concentration is greater than or equal to the first threshold, control returns to step 302, otherwise control adjusts the airflow to increase the oxygen concentration in step 310. Increasing the oxygen concentration increases the efficiency of the PM combustion and promotes complete regeneration of the PM filter 174.

In step 306, control determines whether engine speed is less than or equal to a speed threshold. For example only, the speed threshold may correspond to idle engine conditions. When the engine speed is less than or equal to the speed threshold, control continues to step 312, otherwise control proceeds to step 308.

In step 312, control determines the PM filter temperature. In step 314, control determines a difference between the PM filter temperature and the initial PM filter temperature when regeneration begins. In step 316, control compares the difference to a predetermined exotherm. The predetermined exotherm may be a temperature difference that may correspond to thermal damage of the PM filter 174. When the temperature difference is greater than or equal to the predetermined exotherm, control continues to step 318, otherwise control proceeds to step 308.

In step 318, control determines whether the temperature increase occurred within a predetermined time after initiation of regeneration. For example only, control may store a first time when regeneration begins and a second time when the temperature difference is greater than or equal to the predetermined exotherm. When the temperature difference is greater than or equal to the predetermined exotherm within the predetermined time, control continues to step 320, otherwise control proceeds to step 308.

In step 320, control compares the oxygen concentration to the second threshold. The second threshold may be the same as the first threshold or different than the first threshold. When the oxygen concentration is less than or equal to the second threshold, control returns to step 302, otherwise control adjusts the airflow to decrease the oxygen concentration in step 322. Decreasing the oxygen concentration reduces the efficiency of the PM combustion and decreases the PM filter temperature. Decreasing the PM filter temperature protects the PM filter 174 from damage due to thermal stress.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. An engine control system comprising:
  a first electronic circuit configured to compare an oxygen concentration of an exhaust gas of an engine to an oxygen threshold; and
  a second electronic circuit configured to initiate regeneration of a particulate filter and to control the oxygen concentration during regeneration based on the oxygen comparison and a rate of change of a particulate filter temperature.

2. The engine control system of claim 1, wherein the second electronic circuit is configured to control an airflow of the engine to adjust the oxygen concentration during regeneration.

3. The engine control system of claim 1, wherein the second electronic circuit is configured to control regeneration by decreasing the oxygen concentration when the oxygen concentration is greater than the oxygen threshold and a particulate filter load is greater than a filter load threshold.

4. The engine control system of claim 1, wherein the second electronic circuit is configured to control regeneration by decreasing the oxygen concentration when the oxygen concentration is greater than the oxygen threshold and a speed of the engine is less than or equal to a speed threshold.

5. The engine control system of claim 1, wherein the second electronic circuit is configured to control regeneration by increasing the oxygen concentration when the oxygen concentration is less than the oxygen threshold.

6. The engine control system of claim 1, wherein the second electronic circuit is configured to control an amount of exhaust gas recirculation of the engine during regeneration to adjust the oxygen concentration.

7. The engine control system of claim 1, wherein the second electronic circuit is configured to control a manifold pressure of the engine during regeneration to adjust the oxygen concentration.

8. The engine system of claim 1, wherein the second electronic circuit is configured to control regeneration by adjusting at least one of a throttle valve, an exhaust gas recirculation valve, and a turbocharger.

9. The engine control system of claim 1, wherein the first electronic circuit is configured to measure the oxygen concentration based on a signal from a gas sensor selected from a group of gas sensors including an oxygen sensor, a nitrogen oxide (NOx) sensor, and a lambda sensor.

10. The engine control system of claim 1, wherein the second electronic circuit is configured to control regeneration by decreasing the oxygen concentration when the oxygen concentration is greater than the oxygen threshold and the particulate filter temperature increases by a predetermined amount within a predetermined time of initiation of regeneration.

11. The engine control system of claim 1, wherein the first and second electronic circuits include at least one of an Application Specific Integrated Circuit (ASIC), a processor and memory including one or more programs, and a combinational logic circuit.

12. An engine control system comprising:
a first electronic circuit configured to compare an oxygen concentration of an exhaust gas of an engine to an oxygen threshold; and
a second electronic circuit configured to initiate regeneration of a particulate filter and to control regeneration based on the oxygen comparison and at least one of a particulate filter load, a particulate filter temperature, and a speed of the engine, wherein the second electronic circuit is configured to control regeneration by decreasing the oxygen concentration when the oxygen concentration is greater than the oxygen threshold and the particulate filter temperature increases by a predetermined amount within a predetermined time of initiation of regeneration.

13. The engine control system of claim 12, wherein the first and second electronic circuits include at least one of an Application Specific Integrated Circuit (ASIC), a processor and memory including one or more programs, and a combinational logic circuit.

14. A method comprising:
comparing an oxygen concentration of an exhaust gas of an engine to an oxygen threshold;
initiating regeneration of a particulate filter; and
controlling the oxygen concentration during regeneration of the particulate filter based on the oxygen comparison and a rate of change of a particulate filter temperature.

15. The method of claim 14, further comprising controlling an airflow of the engine to adjust the oxygen concentration during regeneration.

16. The method of claim 14, further comprising decreasing the oxygen concentration when the oxygen concentration is greater than the oxygen threshold and a particulate filter load is greater than a filter load threshold.

17. The method of claim 14, further comprising decreasing the oxygen concentration when the oxygen concentration is greater than the oxygen threshold and a speed of the engine is less than or equal to a speed threshold.

18. The method of claim 14, further comprising increasing the oxygen concentration when the oxygen concentration is less than the oxygen threshold.

19. The method of claim 14, further comprising controlling an amount of exhaust gas recirculation of the engine during regeneration to adjust the oxygen concentration.

20. The method of claim 14, further comprising controlling a manifold pressure of the engine during regeneration to adjust the oxygen concentration.

21. The method of claim 14, further comprising controlling regeneration by adjusting at least one of a throttle valve, an exhaust gas recirculation valve, and a turbocharger.

22. The method of claim 14, further comprising measuring the oxygen concentration based on a signal from a gas sensor selected from a group of gas sensors including an oxygen sensor, a nitrogen oxide (NOx) sensor, and a lambda sensor.

23. The method of claim 14, further comprising decreasing the oxygen concentration when the oxygen concentration is greater than the oxygen threshold and the particulate filter temperature increases by a predetermined amount within a predetermined time of initiation of regeneration.

24. A method comprising:
comparing an oxygen concentration of an exhaust gas of an engine to an oxygen threshold;
initiating regeneration of a particulate filter;
controlling regeneration of the particulate filter based on the oxygen comparison and at least one of a particulate filter load, a particulate filter temperature, and a speed of the engine; and
decreasing the oxygen concentration when the oxygen concentration is greater than the oxygen threshold and the particulate filter temperature increases by a predetermined amount within a predetermined time of initiation of regeneration.

* * * * *